(12) United States Patent
Malin

(10) Patent No.: US 7,207,153 B1
(45) Date of Patent: Apr. 24, 2007

(54) METHOD FOR ATTACHING FITMENT AT LONGITUDINAL FIN SEAL AND PACKAGE RESULTING THEREFROM

(75) Inventor: Art Malin, Northbrook, IL (US)

(73) Assignee: Illinois Tool Works Inc., Glenview, IL (US)

( * ) Notice: Subject to any disclaimer, the term of this patent is extended or adjusted under 35 U.S.C. 154(b) by 550 days.

(21) Appl. No.: 09/452,714

(22) Filed: Dec. 2, 1999

(51) Int. Cl.
*B65B 61/00* (2006.01)

(52) U.S. Cl. .......................... 53/410; 53/450; 53/128.1; 53/133.2

(58) Field of Classification Search ................. 53/410, 53/450, 455, 128.1, 129.1, 133.2, 420, 412; 493/210, 213, 223, 232
See application file for complete search history.

(56) References Cited

U.S. PATENT DOCUMENTS

| | | | |
|---|---|---|---|
| 3,376,687 A | | 4/1968 | Gewecke |
| 3,564,805 A | * | 2/1971 | Mumford ................. 53/420 |
| 3,690,524 A | | 9/1972 | Haberhauer |
| 3,739,522 A | * | 6/1973 | Greenbaum ............... 53/455 |
| 3,812,572 A | | 5/1974 | Weikert |
| 3,894,381 A | | 7/1975 | Christine |
| 4,055,032 A | | 10/1977 | Hammond |
| 4,077,186 A | | 3/1978 | Voegele |
| 4,216,639 A | * | 8/1980 | Gautier ................... 53/455 |
| 4,246,062 A | | 1/1981 | Christine |
| 4,512,136 A | | 4/1985 | Christine |
| 4,533,425 A | | 8/1985 | Wehle |
| 4,686,815 A | * | 8/1987 | Zils et al. ............... 53/469 |
| 4,695,337 A | | 9/1987 | Christine |
| 4,709,528 A | | 12/1987 | Merkus |
| 4,779,397 A | | 10/1988 | Christine |
| 5,564,259 A | * | 10/1996 | Stolmeier ................. 53/410 |
| 5,570,569 A | * | 11/1996 | Masuda .................... 53/410 |
| 5,600,933 A | * | 2/1997 | Wiles et al. .............. 53/410 |
| 5,606,844 A | | 3/1997 | Takagaki |
| 5,678,732 A | | 10/1997 | Gianpaolo |
| 5,819,504 A | | 10/1998 | Giacomelli et al. |
| 5,855,544 A | * | 1/1999 | Buchanan ................ 493/213 |
| 5,862,652 A | | 1/1999 | Schoeler |
| 5,911,340 A | | 6/1999 | Uematsu |
| 6,050,451 A | | 4/2000 | Hess, III et al. |
| 6,131,369 A | * | 10/2000 | Ausnit .................... 53/412 |

FOREIGN PATENT DOCUMENTS

| | | |
|---|---|---|
| AU | 199965136 A | 6/2000 |
| GB | 2 298 850 A | 9/1996 |
| JP | 5-229566 | 9/1993 |
| JP | 11-070907 | 3/1999 |
| WO | WO 96/21599 | 7/1996 |
| WO | 97 15497 | 5/1997 |
| WO | WO 97/15497 | 5/1997 |
| WO | 99 00304 | 1/1999 |
| WO | WO 99/00304 | 1/1999 |
| WO | 99 19134 | 4/1999 |
| WO | WO 99/19134 | 4/1999 |
| WO | 00 23327 | 4/2000 |

* cited by examiner

*Primary Examiner*—Sameh I. Tawfik
(74) *Attorney, Agent, or Firm*—Pitney Hardin LLP

(57) ABSTRACT

The vertical form fill and seal (VFFS) machine is configured to place a fitment, such as a spout, on the longitudinal fin seal of a container. The fitment dispatched from a vibratory bowl via an adjustable track. The fitment is then secured to the edges of the film by longitudinal sealing bars and the edges of the film are likewise secured to each other by the longitudinal sealing bars sealing bars thereby forming a longitudinal fin seal. Depressions are machined in the machine direction center of the sealing bars in order to accommodate the shape of the fitment. The film is drawn over an oversized collar and an undersized tube so as to create excess film in order to form gussets providing a stand-alone capability.

9 Claims, 2 Drawing Sheets

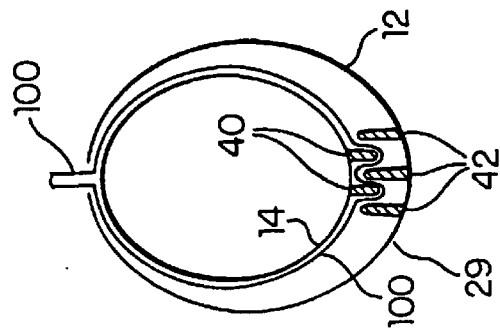
FIG. 3
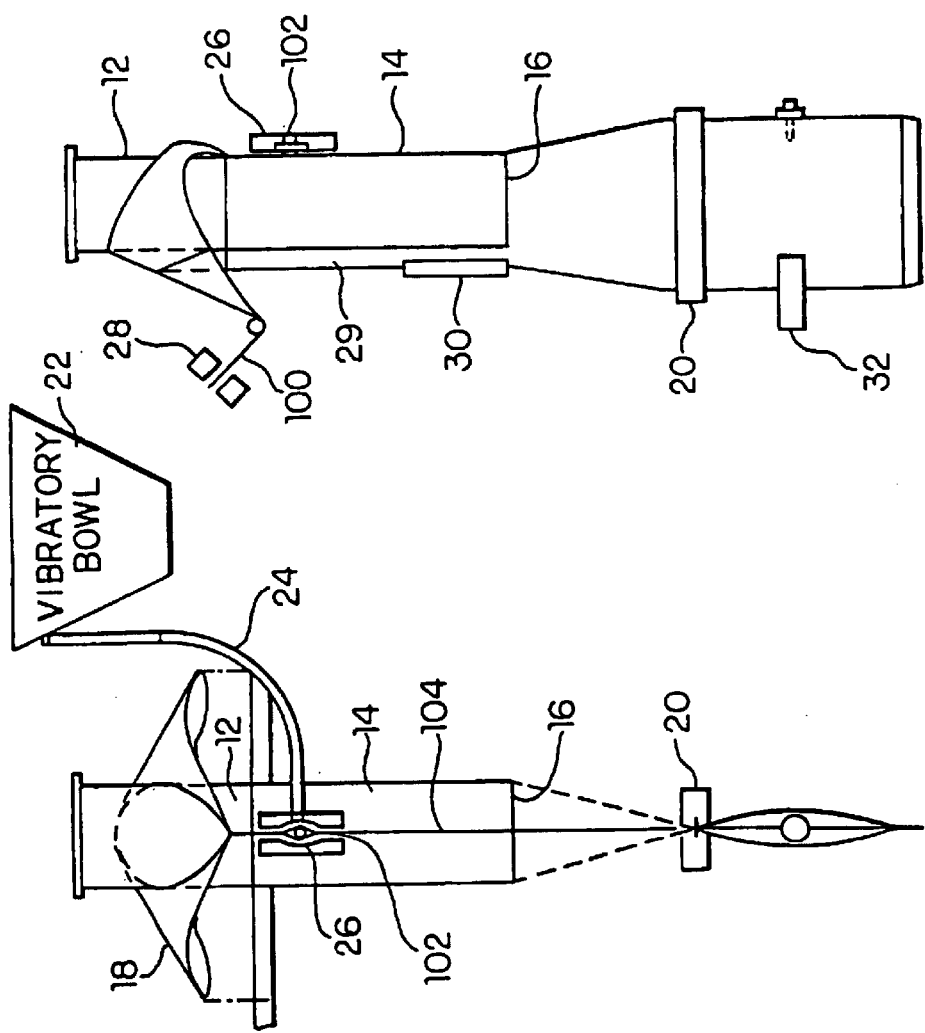
FIG. 2
FIG. 1 ural fin seal.
METHOD FOR ATTACHING FITMENT AT LONGITUDINAL FIN SEAL AND PACKAGE RESULTING THEREFROM

BACKGROUND OF THE INVENTION

1. Field of the Invention

This invention pertains to a method for attaching a fitment to a package being assembled in a vertical form fill and seal machine by feeding the fitments, such as a spout for a pouch, from a vibratory bowl and using longitudinal sealing bars to secure the fitment to the edges of the film and further to secure the edges of the film to each other to form a longitudinal fin seal.

2. Description of the Prior Art

Vertical form fill and seal (VFFS) machines are known in the prior art for forming a container, filling the container with foodstuffs or similar items, and sealing the container. These machines are advantageous in that all three steps are performed in rapid succession in substantially the same location.

However, heretofore, while the advantages of bag-type or pouch containers with a fitment or spout, particularly when the containers are filled with a liquid or paste, have been recognized in such references as U.S. Pat. No. 5,606,844 entitled "Process for Producing a Self-Supporting Package Having an Outlet Stopper and an Apparatus for Producing Said Package", issued on Mar. 4, 1997 to Takagaki et al., the vertical form fill and seal machines have not been adapted to place a fitment, such as a spout, on the longitudinal fin seal of the container being formed, filled and sealed. Similarly, while the use of a horizontal flow, vertical fill machine to put fitments on the bottom folded edge of the resulting pouch has been disclosed in U.S. Pat. No. 4,512,136 entitled "Fitment Attachment Methods in Horizontal Form/Fill/Seal Machines" and issued on Apr. 23, 1985 to Christine, this has not resulted in a pouch with the fitment fitted along the longitudinal fin seal of the pouch, particularly a free-standing pouch manufactured by a vertical form fill and seal apparatus.

Other prior art appears to contemplate sealing fitments to a package on a form fill and seal machine. However, this art appears to be directed to a sealing of a flanged fitment to either the inside wall of the film or the outside wall of the film and puncturing the film to activate the fitment. This art does not disclose the use of a vertical form fill and seal machine to secure to the fitment to the longitudinal fin seal of the pouch.

Prior art in this general field further includes U.S. Pat. No. 5,862,652 entitled "Tubular Bagging Machine with an Asymmetrical Forming Shoulder and Tubular Bags with an Edge-Side Longitudinal Seam", issued on Jan. 26, 1999 to Schoeler and U.S. Pat. No. 3,376,687 entitled "Method of Preparing a Packaged Parenteral Solution" and issued on Jan. 7, 1966 to Gewecke.

OBJECTS AND SUMMARY OF THE INVENTION

It is therefore an object of this invention to use a vertical form fill and seal machine to attach a fitment, such as a spout, to a pouch.

It is therefore a further object of this invention to use a vertical form fill and seal machine to attach a fitment, such as a spout, to a pouch, and may optionally be made in such a way as to make the resulting filled pouch self-supporting.

It is therefore a still further object of this invention to use a vertical form fill and seal machine to attach a fitment to the longitudinal fin seal of the resulting pouch.

These and other objects are attained by providing a vertical form fill and seal machine with cross-sealing jaws turned ninety degrees in the same plane as the longitudinal seal in order to create first and second transverse seals. The longitudinal sealing bars have shaped sealing surfaces at the fin area, with depressions machined in the machine direction center of the longitudinal sealing bars to accommodate the shape of the fitment. Fitments typically have "boat" shaped bosses to facilitate the transition from film to fitment sealing to film to film sealing. The fitments are dispensed from a vibratory bowl assembly onto a track, and down to the center of the sealing bars to match the machined depressions. The sealing bars seal the edges or fins of film around the fitment, and to each other above and below the fitment thereby forming the longitudinal fin seal. The vertical position of the longitudinal sealing bars and the fitment delivery track is adjustable during a size changeover time.

Optionally, the machine can include a device which forms a double fold for a free-standing or stand-up characteristic. This optional device uses the double gusset folding mechanism to fold the excess film created by the oversized collar and undersized tube.

This film is punched in registration to create an ability to seal the outer layers of the film gussets together at the gusset sealers and/or cross-sealing jaws. Alternatively, the film may be formed with a sealant layer on both sides to facilitate sealing the outside layers to each other. Additionally, if a free-standing or stand-up characteristic is desired, the gussets are sealed below the guiding ribs or transition point.

A set of pinching spreaders are positioned below the cross-sealing jaws to pinch or spread the gussets immediately prior to filling, and to create additional space for the product and to move the product away from the cross-sealing jaws thereby improving the cross-seal conditions.

Optionally, the longitudinal sealing bars may include more than one set of depressions resulting in multiple film to fitment sealing positions.

BRIEF DESCRIPTION OF THE DRAWINGS

Further objects and advantages of the invention will become apparent from the following description and claims, and from the accompanying drawings, wherein:

FIG. 1 is a front plan view of the vertical form fill and seal machine of the present invention.

FIG. 2 is a side plan view of the vertical form fill and seal machine of the present invention.

FIG. 3 is a cross-sectional view of the tube and collar of the vertical form fill and seal machine of the present invention, illustrating how the stand-up feature of the pouch is implemented on the film.

DETAILED DESCRIPTION OF THE PREFERRED EMBODIMENT

Figure 4:
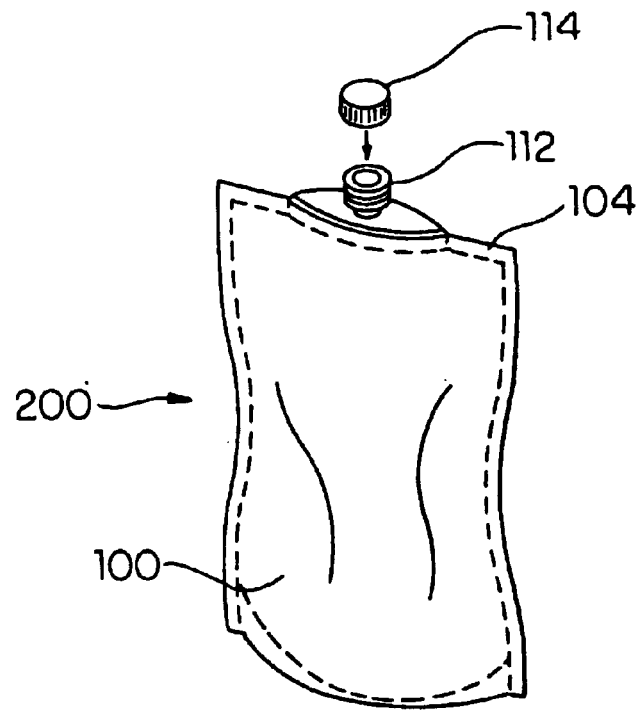
FIG. 4 is a perspective view of a typical resulting package with a fitment.

Referring now to the drawings in detail wherein like numerals refer to like elements throughout the several views, one sees that FIG. 1 is a front plan view of the vertical form fill and seal machine 10 of the present invention.

Oversized cylindrical collar 12 is formed concentrically about undersized tube 14. As is known with form fill and seal machines, the contents of the resulting pouch are fed through bottom opening 16 of tube 14 into the pouch which is formed by the film 100 which passes over collar 12 and tube 14 as guided by obliquely oriented shoulder 18 (also see FIGS. 2 and 3). Cross-sealing jaws 20 are formed horizontally below bottom opening 16 of tube 14 in order to cut the film 100 into separate bags or pouches and to form the transverse seal and hence the package which secures the contents during the initial filling. Cross-sealing jaws 20 furthermore seal the previously filled package during the same step.

Figure 5:
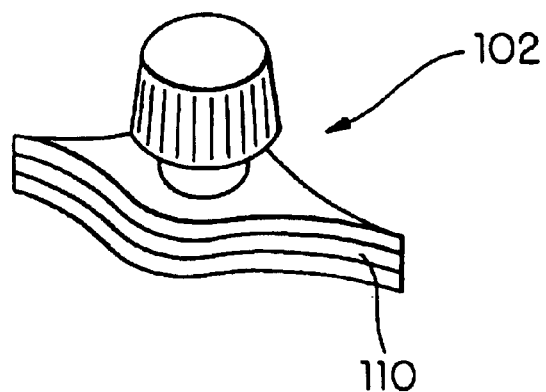
FIG. 5 is a perspective view of a typical fitment used with the present invention.

Vibratory bowl 22 is situated so tube 14 dispatches fitments 102 via telescoping track 24 to longitudinal sealing bars 26 which secure the edges of the film 100 to fitment 102 (see FIGS. 4 and 5 for the detail of a typical fitment 102, which typically includes "boat" shaped bosses 110, a threaded spout 112, and a threaded cap 114). The longitudinal sealing bars 26 further join the edges of the film 100 to each other above and below fitment 102 thereby forming longitudinal fin seal 104 of the film 100. The position of the longitudinal sealing bars 26 and the telescoping track 24 is adjustable so as to accommodate several different bag widths. These positions would typically be changed at size changeover time.

As shown in FIG. 2, hole punching gusset 28 punches the film 100 in registration to create an ability to seal the outer layers of film gussets together at the gusset sealing jaws 30 and/or cross-sealing jaws 20.

Double gusset former 29 is positioned generally below hole punching gusset 28 and 180° from longitudinal sealing bars 26 in order to form the structure shown in FIG. 3 wherein outwardly protruding ribs 40 are formed on undersized tube 14 and inwardly protruding ribs 42 are formed on oversized cylindrical collar 12 in order to form a double fold for the stand-up feature. The oversized collar 12 and undersized tube 14 create excess film, which is thereby folded by the double gusset former 29 and thereafter sealed by gusset sealing jaws 30.

As shown in FIG. 2, gusset or pinching spreaders 32 are positioned to pinch or spread the gussets prior to filling, particularly if a viscous or paste-like substance is being filled, to create additionally space for the product and to move the product away from the cross-sealing jaw 20. Moreover, this improves the cross-seal conditions.

A typical resulting package 200 is shown in FIG. 4 wherein fitment 102 is sealed within seal 104.

Thus the several aforementioned objects and advantages are most effectively attained. Although a single preferred embodiment of the invention has been disclosed and described in detail herein, it should be understood that this invention is in no sense limited thereby and its scope is to be determined by that of the appended claims.

What is claimed is:

1. A method of forming a sealed container enclosing a product to be dispensed through a fitment secured to the sealed container, comprising the steps of:

bringing opposite longitudinal edges of a single film together to wrap the film into a generally cylindrical shape by drawing the film over an oversized collar and an undersized tube thereby creating excess film in said generally cylindrical shape;

forming a gusset with the excess film by providing a means for forming the gusset film thereby causing said container to have a free-standing capability, said means for forming a gusset being positioned between said oversized collar and said undersized tube;

dispatching a fitment between the longitudinal edges of the single film;

securing the fitment between the longitudinal edges of the single film;

securing the opposite longitudinal edges of the single film to each other on opposite sides of the fitment and to the fitment thereby joining the edges in a longitudinal fin seal to complete the generally cylindrical shape; and forming a first transverse seal across the cylindrical shape.

2. The method of claim 1 further comprising the step of forming a second transverse seal thereby sealing the container.

3. The method of claim 2 wherein said step of forming a first transverse seal is performed simultaneously with said step of forming a second transverse seal for a previous container.

4. The method of claim 3 further including the step of providing contents to the container prior to said step of forming a second transverse seal.

5. The method of claim 4 wherein said steps of securing the fitment and securing the longitudinal edges are performed by a common set of longitudinal sealing bars.

6. The method of claim 5 wherein said steps of forming a first transverse seal and the second transverse seal are performed by transverse sealing jaws.

7. The method of claim 6 further including the step of providing depressions in the longitudinal sealing bars to receive the fitments in said step of securing the fitment.

8. The method of claim 1 further including the step of using means for spreading portions of the container thereby providing additional room for the product prior to said step of forming a second transverse seal.

9. The method of claim 8 including the step of providing means for varying a position of the sealing bars.

* * * * *